United States Patent [19]

Glass et al.

[11] Patent Number: 4,715,687

[45] Date of Patent: Dec. 29, 1987

[54] COLOR VARIATION IN A PASSIVELY ILLUMINATED DISPLAY USING FLUORESCENT LIGHT SOURCES

[75] Inventors: David W. Glass, Georgetown; Wilson M. Routt, Jr., Lexington, both of Ky.

[73] Assignee: International Business Machines Corporation, Armonk, N.Y.

[21] Appl. No.: 945,630

[22] Filed: Dec. 23, 1986

[51] Int. Cl.$^4$ .................... G02F 1/13; F21K 2/00; H01J 1/62; H05B 37/00
[52] U.S. Cl. .................... 350/345; 350/332; 350/333; 250/462.1; 315/363; 313/486
[58] Field of Search ............ 350/332, 333, 345, 339 D, 350/350 S; 250/462.1; 313/117, 486; 315/360, 363

[56] References Cited

U.S. PATENT DOCUMENTS

| | | | |
|---|---|---|---|
| 3,840,695 | 10/1974 | Fischer | 350/345 X |
| 3,916,245 | 10/1975 | Dorf et al. | 313/486 |
| 4,487,481 | 12/1984 | Suzawa | 350/345 |
| 4,559,480 | 12/1985 | Nobs | 315/363 X |
| 4,611,889 | 9/1986 | Buzak | 350/345 X |

FOREIGN PATENT DOCUMENTS 53-98851  8/1978  Japan ................. 250/462.1

OTHER PUBLICATIONS

Hasebe, H. et al., "A Full-Color Field-Sequential LCD Using Modulated Backlight," *S.I.D. Digest* (1985), pp. 81–83.

*Primary Examiner*—S. D. Miller
*Assistant Examiner*—Richard Gallivan
*Attorney, Agent, or Firm*—Frank C. Leach, Jr.; John A. Brady

[57] ABSTRACT

A light source, which has a time varying chromatic output, back lights or front lights a plurality of liquid crystal displays disposed in a desired arrangement. Two different colors can be produced at two different times by using a fluorescent light as the light source. The fluorescent light is a sealed tube having a high vacuum with an insert gas therein for energization of the gas and a low pressure mercury vapor. The tube has a coating on the inner surface of the tube of at least one phosphor. Energization of the inert gas causes the low pressure mercury vapor to arc to produce light of a first color during a first time period with the light of the second color being produced solely from the phosphor coating upon the gas being deenergized during the second time period. Each of the liquid crystal displays can be activated during the first time period, the second time period, both time periods, or remain inactivated during both time periods. This selective activation or inactivation of each liquid crystal display produces displayed information in the first color, the second color, or both colors. By forming the coating of a mixture of two phosphors with substantially different persistence times, a second color is produced during the second time period from the phosphor mixture, and a third color is produced during a third time period after the second time period solely from the phosphor having the longer persistence time.

19 Claims, 4 Drawing Figures

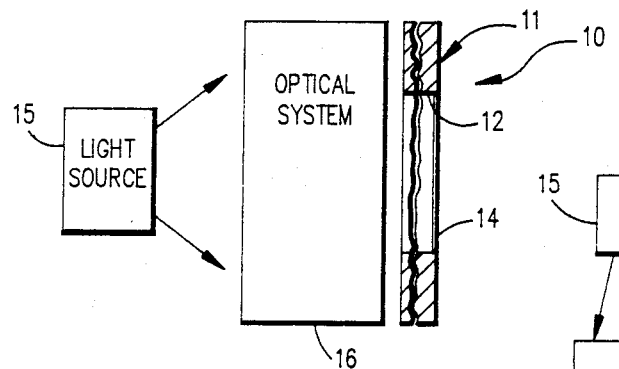
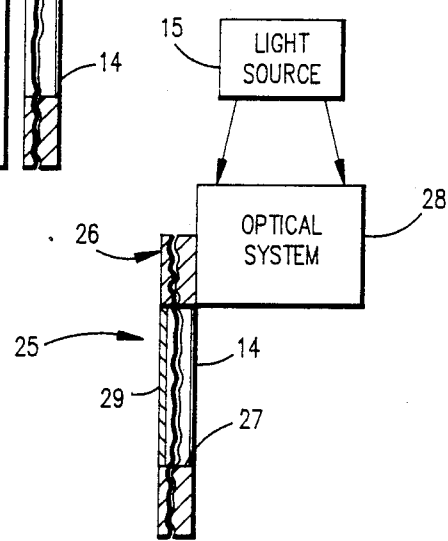
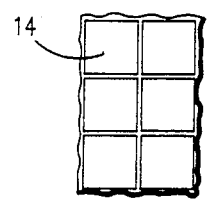
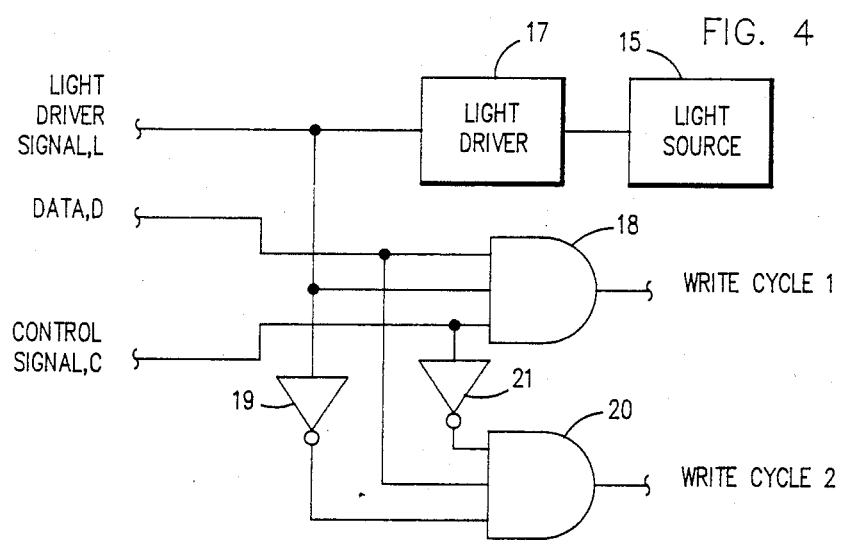

COLOR VARIATION IN A PASSIVELY ILLUMINATED DISPLAY USING FLUORESCENT LIGHT SOURCES

FIELD OF THE INVENTION

This invention relates to a passively illuminated display and, more particularly, to a passively illuminated display having color variation.

BACKGROUND OF THE INVENTION

To obtain color variation in a passively illuminated display, it has previously been necessary to have two color sources for two or three colors and three color sources for four to seven colors, for example. Each of the separate color sources has required a separate set of liquid crystal display (LCD) switches and associated drive circuits. Thus, this type of color variation for a passively illuminated display is relatively expensive.

Color variation in a passively illuminated display has particular utility in word processing, for example. That is, a misspelled word could be displayed in a first color and a correctly spelled word displayed in a second color, for example. Color variation also will enable the LCD switches to function as a color television screen.

SUMMARY OF THE INVENTION

The passively illuminated display of the present invention is capable of producing color variation with only a single light source having a time varying chromatic output. It also is capable of having the color variation with only a single set of LCD switches and associated drive circuitry. Thus, the passively illuminated display of the present invention significantly reduces the costs of obtaining color variation in a passively illuminated display.

The passively illuminated display of the present invention utilizes the phenomenon of persistence in many phosphor materials in which a phosphor has its visible output decrease gradually over a period of time after excitation is removed. Thus, a single fluorescent light could be used as the light source for an array of LCDs. When the fluorescent light is energized, a first color is produced due to the phosphor material and the superposition of mercury lines in the low pressure mercury vapor arc within the fluorescent light. When the fluorescent light is turned off, the visible output due to the mercury lines decreases to zero almost instantly when current flow ceases, but there is visible output from the phosphor material for a period of time. This decay time of the visible output of phosphor material ranges from a few microseconds to several hundred milliseconds depending upon the phosphor material.

Furthermore, the coating on the inner surface of the tube of the fluorescent light can have a mixture of two or more phosphors with substantially different persistence times. This would enable large differences in color variation to be produced since the decay time of one of the two phosphors in the mixture would be substantially longer than the other. This also permits three colors to be produced in three different time periods.

When using the mixture of two phosphors, one of the two phosphors could have a decay time so fast that it does not produce a visible output beyond ten microseconds, for example. This short decay time phosphor would not create a second color but only enhance the output from the mercury lines during the first time period when the fluorescent light is on. Therefore, a mixture of two phosphors does not necessarily produce three colors in three time periods.

Instead of using one fluorescent light with its inner surface coating having a mixture of two phosphors, two separate fluorescent lights could be employed with one having its inner surface coating of one of the two phosphors and the other having its inner surface coating of the other of the two phosphors. These also would constitute a single light source with a time varying chromatic output.

An object of this invention is to provide a passively illuminated display having a plurality of colors produced through a single switch.

Another object of this invention is to provide a passively illuminated display capable of displaying a plurality of colors at a relatively low cost.

A further object of this invention is to provide a passively illuminated display having a separate light source with a time varying chromatic output.

The foregoing and other objects, features, and advantages of the invention will be apparent from the following more particular description of the preferred embodiments of the invention as illustrated in the accompanying drawings.

BRIEF DESCRIPTION OF THE DRAWINGS

In the drawings:

FIG. 1 is a schematic view of a back lit passively illuminated display of the present invention.

FIG. 2 is a fragmentary elevational view of a portion of the display of FIG. 1.

FIG. 3 is a schematic view of a front lit passively illuminated display of the present invention.

FIG. 4 is a block diagram of logic circuitry utilized for controlling each LCD of the display of FIG. 1 or 3.

DETAILED DESCRIPTION

Referring to the drawings and particularly FIG. 1, there is shown a back lit passively illuminated display 10 including a mount 11 having an opening 12 formed therein to receive a plurality of LCDs 14 (see FIG. 2) formed in an array of horizontal rows and vertical columns. In a typical viewing screen, there could be six hundred and forty of the LCDs 14 in each horizontal row and two hundred of the LCDs 14 in each vertical column. This is generally the same resolution as that of current viewing screens in word processing and personal computer equipment.

The LCDs 14 are high speed LCDs, namely, a smectic C or ferro electric. One suitable example of the LCDs 14 is sold by Display Tech, Inc., 2200 Central Avenue, Boulder, Colo.

A light source 15 (see FIG. 1) is disposed at the back of the mount 11 and applies light equally over all of the LCDs 14 (see FIG. 2) through the use of an optical system 16. The optical system 16 includes the necessary light scattering or other optics to insure that there is equal illumination at the back of each of the LCDs 14 (see FIG. 2) so as to back light the LCDs 14.

The light source 15 (see FIG. 1) is preferably a fluorescent light comprising a sealed tube having an inert gas with a high vacuum and a low pressure mercury vapor therein. The tube has a coating of at least one phosphor on its inner surface. It should be understood that any other suitable light source may be employed provided a visible output ceases as soon as the light source 15 is inactivated with the on-off cycle being very short such as up to about 0.03 second.

As shown in FIG. 4, the light source 15 is controlled by a light driver signal L from a suitable control source such as an oscillator producing a square wave output, for example. It should be understood that the duty cycle does not have to be 50%. The signal L is supplied to the light source 15 through a light driver 17.

The light driver signal L also is supplied as one input to an AND gate 18 and is inverted by an inverter 19 prior to being supplied as one input to an AND gate 20. The AND gate 18 has data D, which can be a serial stream, applied thereto from a keyboard, for example, or from a television set where the LCDs 14 (see FIG. 2) would function as a television screen.

A third input to the AND gate 18 (see FIG. 4) is a control signal C, which is externally supplied. For example, it could be supplied from logic in word processing software where the signal C would be high when a misspelled word was found during checking for spelling, for example, and is to be displayed. The control signal C is inverted by an inverter 21 before being supplied as an input to the AND gate 20.

It should be understood that each of the LCDs 14 (see FIG. 2) is connected to one set of the AND gates 18 (see FIG. 4) and 20. Thus, the diagram of FIG. 4 is for only one of the LCDs 14 (see FIG. 2).

When the light driver signal L is up and the control signal C is up, the output of the AND gate 18 corresponds to the data D supplied thereto. This causes the LCD 14 (see FIG. 2) connected to the AND gate 18 (see FIG. 4) to receive a high signal, when the data D is high, to cause the LCD 14 (see FIG. 2) to be inactivated to pass light. This output of the AND gate 18 (see FIG. 4) is indicated by WRITE CYCLE 1 in FIG. 4. Thus, the LCD 14 (see FIG. 2) is inactivated in its selected state in which it passes light from the light source 15 (see FIG. 4).

When the light driver signal L goes down, a high is supplied from the inverter 19 as an input to the AND gate 20. Unless the control signal C is low, there will be no output from the AND gate 20. If the control signal C is down, then the output of the AND gate 20 will be the data D since the control signal C is inverted by the inverter 21. When the data D is high, the output of the AND gate 20 is high. This will result in the LCD 14 (see FIG. 2), which is the same LCD 14 that is connected to the AND gate 18 (see FIG. 4), being inactivated to pass light from the light source 15. This is indicated by WRITE CYCLE 2 in FIG. 4. The AND gates 18 and 20 supply a serial data stream to a multiplexed LCD driver which sets the state of each of the LCDs 14 (see FIG. 2) during WRITE CYCLEs 1 and 2 (see FIG. 4).

It should be understood that the control signal C will be either up or down during both portions of the on-off cycle for the light driver signal L. However, the control signal C could be the same state as the light driver signal L whereby the LCD 14 (see FIG. 2) could pass light from the light source 15 (see FIG. 4) during both of the time periods if desired.

Accordingly, when the control signal C is up for a complete cycle, the LCD 14 (see FIG. 2) passes light of the first color during the time that the light source 15 (see FIG. 4) is energized by the high light driver signal L. This is during the first time period of the cycle (WRITE CYCLE 1).

When the control signal C is down for a complete cycle, the AND gate 20 will have an output during the second time period of the cycle (WRITE CYCLE 2) of the light driver signal L. Therefore, only the light produced by the phosphor coating after the light source 15 has been inactivated passes through the LCD 14 (see FIG. 2) to produce the second color.

If the LCD 14 is to pass light of two different colors during the two different time periods in which the light source 15 (see FIG. 4) is turned on and off, the control signal C is equal to the light driver signal L. This results in a high output from the AND gate 18 rendering the LCD 14 (see FIG. 2) inactive during the first time period of the cycle and a high output from the AND gate 20 (see FIG. 4) rendering the LCD 14 (see FIG. 2) inactive during the second time period in which the light source 15 is off. When the light source 15 is off, the light passing through the LCD 14 (see FIG. 2) is due solely to the phosphor having its visible output decay after having been excited when the light source 15 (see FIG. 1) was energized.

Referring to FIG. 3, there is shown a front lit passively illuminated display 25 including a mount 26 having an opening 27 therein. A plurality of the LCDs 14 is mounted within the opening 27 in the mount 26 in the same manner as described for mounting the LCDs 14 in the opening 12 (see FIG. 1) in the mount 11 of the back lit passively illuminated display 10.

The light source 15 (see FIG. 3) supplies light through an optical system 28 in the same manner as described for FIG. 1. In this arrangement, a reflective material 29 (see FIG. 3) is mounted at the rear of the LCDs 14 to reflect the light from the light source 15 through the LCDs 14 that are rendered inactive during the first and/or second time periods of each cycle of the light source 15.

The front lit passively illuminated display 25 functions in the same manner as the back lit passively illuminated display 10 (see FIG. 1) other than that light is reflected from the reflective material 29 (see FIG. 3) through the LCDs 14 rather than passing through them directly from the light source 15 as in the back lit passively illuminated display 10 of FIG. 1.

Instead of using the LCDs 14, any suitable fast switching optical switch may be employed. For example, a magneto-optic switch or a piezoelectric switch could be utilized. There must be the fast switching in order to switch states of the switch during each time that the light source 15 is turned on or off.

Furthermore, with the light source 15 being a fluorescent light, it is not necessary that there be only a single phosphor coating. That is, the coating could be a mixture of at least two phosphors with each phosphor having a substantially different time period in which its visible output decreases gradually after excitation by the light source 15 is removed whereby there could be three different time periods. That is, the first time period would be when the light source 15 is activated, the second time period would be when the mixture of the two phosphors decays until there is only one phosphor still producing a visible output, and a third time period would be when there is light only from the one phosphor having the longer decay time.

When using the mixture of two phosphors, it should be understood that one of the two phosphors could have a very short delay time such as ten microseconds, for example. This short decay time phosphor would not create a second color during the short time that it is excited after the fluorescent light is turned off, but it would enhance the output from the mercury lines during the first time period when the fluorescent light is activated. Thus, a mixture of two phosphors does not necessarily produce three time periods because this depends on the decay time of each phosphor.

It should be understood that the LCDs 14 (see FIG. 2) could be utilized in an arrangement to function as the display of a color television. This would be much less expensive than a cathode ray tube.

Additionally, the light source 15 (see FIG. 1) could be more than one fluorescent light with each fluorescent light having only a single and different phosphor coating. Thus, the lights would be activated only in the first time period, the second time period would be when both phosphors are producing a visible output, and the third time period would be when only the phosphor of one fluorescent light is producing a visible output. This would necessitate a third WRITE CYCLE to be controlled from a third AND gate having the same inputs as the AND gate 20 (see FIG. 4) in the circuit of FIG. 4 with a time delay for the control signal C slightly greater than the persistence time of the phosphor of the other fluorescent light.

An advantage of this invention is that only a single light source is required for a passively illuminated display to display a plurality of colors. Another advantage of this invention is that color variation can be obtained from liquid crystal displays rather than requiring a cathode ray tube. A further advantage of this invention is that a passively illuminated display displays information by color differentiation.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A passively illuminated display including:
   a plurality of switch means disposed in a desired arrangement;
   light source means disposed to illuminate each of said switch means to enable each of said switch means to display light from said light source means when said switch means is in its selected state;
   activating means to activate said light source means at rapid time intervals;
   said light source means producing light of a first color during a first time period when said light source means is activated by said activating means and at least light of a second color during a second time period when said light source means is not activated by said activating means;
   and means to selectively control each of said switch means to cause each of said switch means to be in the selected state for displaying light from said light source means during the first time period, the second time period, or not to be in the selected state during either of the time periods, each of said switch means displaying light of the first color if in the selected state during the first time period and displaying light of the second color if in the selected state during the second time period.

2. The display according to claim 1, in which said light source means is disposed to back-light each of said switch means so that light of the first color from said light source means or light of the second color from said light source means is passed by each of said switch means in its selected state.

3. The display according to claim 2, in which said light source means comprises a sealed tube having a high vacuum and a gas therein and a coating of at least one phosphor on its inner surface, said tube energizing the gas during the first time period to produce light of the first color and said coating producing light of the second color when the gas within said tube is deenergized during the second time period.

4. The display according to claim 3, in which:
   said coating on the inner surface of said tube includes at least two phosphors having different persistence times so that said coating produces a second color during a second time period upon said gas within said tube being deenergized and a third color during a third time period upon the expiration of the second time period when the phosphor of said coating with the shorter persistence time ceases to produce a visible output;
   and said selectively control means controls each of said switch means to control when and if each of said switch means is in its selected state during the first, second, and third time periods.

5. The display according to claim 4, in which each of said switch means is a liquid crystal display.

6. The display according to claim 3, in which each of said switch means is a liquid crystal display.

7. The display according to claim 2, in which said light source means comprises two sealed tubes, each of said tubes having a high vacuum and a gas therein and a coating of a phosphor on its inner surface, each of said tubes energizing the gas therein simultaneously during the first time period to produce light of the first color, each of the phosphors having a different persistence time so that said coatings of said tubes produce a second color during a second time period upon said gas being deenergized simultaneously in each of said tubes, and said coating of one of said tubes produces a third color during a third time period upon expiration of the second time period when the phosphor of said coating of the other of said tubes ceases to produce a visible output due to it having the shorter persistence time.

8. The display according to claim 1, in which:
   said light source means is disposed to front light each of said switch means;
   and reflecting means reflects light of the first color from said light source means and light of the second color from said light source means for display by said switch means when said switch means is in its selected state.

9. The display according to claim 8, in which said light source means comprises a sealed tube having a high vacuum and a gas therein and a coating of at least one phosphor on its inner surface, said tube energizing the gas during the first time period to produce light of the first color and said coating producing light of the second color when the gas within said tube is deenergized during the second time period.

10. The display according to claim 9, in which:
    said coating on the inner surface of said tube includes at least two phosphors having different persistence times so that said coating produces a second color during a second time period upon said gas within said tube being deenergized and a third color during a third time period upon the expiration of the second time period when the phosphor of said coating with the shorter persistence time ceases to produce a visible output;

and said selectively control means controls each of said switch means to control when and if each of said switch means is in its selected state during the first, second, and third time periods.

11. The display according to claim 10, in which each of said switch means is a liquid crystal display.

12. The display according to claim 9, in which each of said switch means is a liquid crystal display.

13. The display according to claim 8, in which said light source means comprises two sealed tubes, each of said tubes having a high vacuum and a gas therein and a coating of a phosphor on its inner surface, each of said tubes energizing the gas therein simultaneously during the first time period to produce light of the first color, each of the phosphors having a different persistence time so that said coatings of said tubes produce a second color during a second time period upon said gas being deenergized simultaneously in each of said tubes, and said coating of one of said tubes produces a third color during a third time period upon expiration of the second time period when the phosphor of said coating of the other of said tubes ceases to produce a visible output due to it having the shorter persistence time.

14. The display according to claim 1, in which said light source means comprises a sealed tube having a high vacuum and a gas therein and a coating of at least one phosphor on its inner surface, said tube energizing the gas during the first time period to produce light of the first color and said coating producing light of the second color when the gas within said tube is deenergized during the second time period.

15. The display according to claim 14, in which: said coating on the inner surface of said tube includes at least two phosphors having different persistence times so that said coating produces a second color during a second time period upon said gas within said tube being deenergized and a third color during a third time period upon the expiration of the second time period when the phosphor of said coating with the shorter persistence time ceases to produce a visible output;

and said selectively control means controls each of said switch means to control when and if each of said switch means is in its selected state during the first, second, and third time periods.

16. The display according to claim 15, in which each of said switch means is a liquid crystal display.

17. The display according to claim 14, in which each of said switch means is a liquid crystal display.

18. The display according to claim 1, in which each of said switch means is a liquid crystal display.

19. The display according to claim 1, in which said light source means comprises two sealed tubes, each of said tubes having a high vacuum and a gas therein and a coating of a phosphor on its surface, each of said tubes energizing the gas therein simultaneously during the first time period to produce light of the first color, each of the phosphors having a different persistence time so that said coatings of said tubes produce a second color during a second time period upon said gas being deenergized simultaneously in each of said tubes, and said coating of one of said tubes produces a third color during a third time period upon expiration of the second time period when the phosphor of said coating of the other of said tubes ceases to produce a visible output due to it having the shorter persistence time.

* * * * *